US012570543B2

(12) United States Patent
Sommer et al.

(10) Patent No.: US 12,570,543 B2
(45) Date of Patent: Mar. 10, 2026

(54) COATED PARTICULATE ELECTRODE ACTIVE MATERIALS

(71) Applicant: BASF SE, Ludwigshafen am Rhein (DE)

(72) Inventors: Heino Sommer, Ludwigshafen (DE); Felix Florian Riewald, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 586 days.

(21) Appl. No.: 18/001,273

(22) PCT Filed: Jun. 18, 2021

(86) PCT No.: PCT/EP2021/066523

§ 371 (c)(1),
(2) Date: Dec. 9, 2022

(87) PCT Pub. No.: WO2022/008203

PCT Pub. Date: Jan. 13, 2022

(65) Prior Publication Data

US 2023/0249982 A1 Aug. 10, 2023

(30) Foreign Application Priority Data

Jul. 6, 2020 (EP) .................................... 20184157

(51) Int. Cl.
*C01G 53/50* (2025.01)

(52) U.S. Cl.
CPC .......... *C01G 53/50* (2013.01); *C01P 2002/85* (2013.01); *C01P 2004/03* (2013.01); *C01P 2004/32* (2013.01); *C01P 2004/50* (2013.01); *C01P 2004/61* (2013.01); *C01P 2006/12* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 10,693,136 | B2 | 6/2020 | Choi et al. | |
| 10,700,355 | B2 | 6/2020 | Choi et al. | |
| 11,710,824 | B2 | 7/2023 | Choi et al. | |
| 2008/0032196 | A1* | 2/2008 | Park | C01D 15/02 429/223 |
| 2016/0359165 | A1 | 12/2016 | Kim et al. | |
| 2017/0317344 | A1* | 11/2017 | Tan | H01M 10/0525 |
| 2019/0334163 | A1* | 10/2019 | Lee | C01G 53/42 |
| 2019/0379038 | A1* | 12/2019 | Toma | C01G 53/04 |
| 2022/0212950 | A1* | 7/2022 | Bergner | C01G 53/42 |
| 2024/0072244 | A1* | 2/2024 | Lee | H01M 4/525 |

FOREIGN PATENT DOCUMENTS

| | | | |
|---|---|---|---|
| JP | 201814208 | A | 1/2018 |
| JP | 202087823 | A | 6/2020 |
| WO | WO-2020069882 | A1 | 4/2020 |

OTHER PUBLICATIONS

International Search Report Dated Jul. 28, 2021, PCT/EP2021/066523.

European Search Report for EP Patent Application No. 20184157.4, Issued on Jan. 13, 2021, 3 pages.

* cited by examiner

*Primary Examiner* — Kevin M Bernatz
(74) *Attorney, Agent, or Firm* — Armstrong Teasdale LLP

(57) ABSTRACT

Particulate materials of the composition $Li_{1+x}TM_{1-x}O_2$ wherein x is in the range of from −0.02 to +0.05, TM comprises at least 94 mol-% nickel and up to 6 mol-% of at least three metals M1 selected from Co, Mn, Cu, Mg, Fe, B, Al, Ce, Sn, Zr, Zn, Nb, Ta, Y, Mo and W, wherein said metals $M^1$ are enriched at the outer surface of the secondary particles of said particulate material, and wherein said particulate material has an average particle diameter (D50) in the range of from 2 to 20 μm.

14 Claims, No Drawings

COATED PARTICULATE ELECTRODE ACTIVE MATERIALS

This application is a national stage filing under 35 U.S.C. § 371 of International Application No. PCT/EP2021/066523, filed on Jun. 18, 2021, and claims priority to European Application No. 20184157.4, filed Jul. 6, 2020; the contents of each application is incorporated herein by reference in its entirety.

The present invention is directed towards particulate materials of the composition $Li_{1+x}TM_{1-x}O_2$ wherein x is in the range of from −0.02 to +0.05, TM comprises at least 94 mol-% nickel and up to 6 mol-% of at least three metals $M^1$ selected from Co, Mn, Cu, Mg, Fe, Ga, B, Al, Ce, Sn, Zr, Zn, Nb, Ta, Y, Mo and W, said particulate material being composed of secondary particles that are agglomerates from primary particles, wherein said metals $M^1$ are enriched at the outer surface of the secondary particles of said particulate material, and wherein said particulate material has an average particle diameter (D50) in the range of from 2 to 20 μm.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many electrode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$— and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid-state reaction takes place, and the electrode active material is formed. In cases hydroxides or carbonates are used as precursors the solid-state reaction follows a removal of water or carbon dioxide. The thermal treatment is performed in the heating zone of an oven or kiln.

In order to improve the capacity of cathode active materials, it has been suggested to select as high a nickel content as possible. However, in materials such as $LiNiO_2$, it has been observed that poor cycle life, pronounced gassing and a strong increase of the internal resistance during cycling provide high challenges for a commercial application.

Accordingly, the particulate materials as defined at the outset have been found, hereinafter also defined as inventive materials or as materials according to the current invention. The inventive materials shall be described in more detail below.

Inventive materials have a composition according to the formula $Li_{1+x}TM_{1-x}O_2$ wherein x is in the range of from −0.02 to +0.05, TM comprises at least 94 mol-% nickel and up to 6 mol-% of at least three metals $M^1$ selected from Co, Mn, Cu, Mg, Fe, B, Al, Ce, Zr, Zn, Sn, Nb, Ta, Y, Mo and W, preferably at least four metals $M^1$ selected from Co, Mn, Mg, Fe, Ga, Al, Zr, Ta, Zn, Sn, Cu, Ce and Y, more preferably a combination of at least four metals $M^1$ that includes Co, Mn, Fe, Al, and Y, wherein said metals $M^1$ are enriched at the outer surface of the secondary particles of said particulate material, and wherein said inventive materials have an average particle diameter (D50) in the range of from 2 to 20 μm.

In one embodiment of the present invention, inventive materials are comprised of spherical particles, that are particles having a spherical shape. Spherical particles shall include not just those which are exactly spherical but also those particles in which the maximum and minimum diameter of at least 90% (number average) of a representative sample differ by not more than 10%.

The inventive material have an average particle diameter (D50) in the range of from 2 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the inventive material is comprised of secondary particles that are agglomerates of primary particles. Preferably, the inventive material is comprised of spherical secondary particles that are agglomerates of primary particles. Even more preferably, inventive material is comprised of spherical secondary particles that are agglomerates of spherical primary particles or platelets.

In one embodiment of the present invention, primary particles of inventive material have an average diameter in the range from 1 to 3000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy, and XRD stands for X-ray diffraction.

In one embodiment of the present invention, the inventive material has a specific surface (BET), hereinafter also referred to as "BET surface", in the range of from 0.1 to 2.0 $m^2/g$. The BET surface may be determined by nitrogen adsorption after outgassing of the sample at 200° C. for 30 minutes or more and beyond this accordance with DIN ISO 9277:2010.

TM is mostly nickel, for example at least 94 mol-%, preferably at least 95 mol-%. An upper limit of 99.5 mol-% is preferred.

Some metals are ubiquitous metals such as sodium, calcium or zinc, but such traces will not be taken into account in the description of the present invention. Traces in this context will mean amounts of 0.05 mol-% or less, referring to the total metal content TM.

In one embodiment of the present invention, TM is a combination of metals according to general formula (I)

$$(Ni_aM_{1-a}) \quad (I)$$

with $M^1$ being a combination of at least four metals $M^1$ selected from Co, Mn, Mg, Fe, Ga, Al, Zr, Ta, Zn, Sn, Cu, Ce and Y, more preferably a combination of at least five of the above metals $M^1$ that includes Co, Mn, Fe, Al, and Y, and a being in the range of from 0.97 to 0.995.

In one embodiment of the present invention, the molar amounts of different metals $M^1$ are significantly different and distinguished by a factor of up to 10. In a preferred embodiment, the molar amounts of each of the metals $M^1$ is about the same. That means that the molar amount of the most abundant metal $M^1$ in an inventive material differs from the rarest metal M1 in the respective inventive material by a maximum of 25 mole-%, preferably by a maximum of 10 mole-%, and even more preferably by a maximum of 5 mole-%.

In inventive materials, said metals $M^1$ are enriched at the surface, said enrichment being determined by Scanning Electron Microscopy ("SEM") of cross-sectioned particles combined with Energy Dispersive X-ray Spectroscopy ("EDX") along the particle diameter. Cross sections may be obtained by ion polishing particles embedded in a resin.

In a specific embodiment of the present invention, secondary particles of inventive material are coated with a metal oxide, preferably with a metal oxide that does not serve as a cathode active material. examples of suitable metal oxides are $LiBO_2$, $B_2O_3$, $Al_2O_3$, $Y_2O_3$, $LiAlO_2$, $TiO_2$, $ZrO_2$, $Li_2ZrO_3$, $Nb_2O_5$, $LiNbO_3$, $Ta_2O_5$, $LiTaO_3$.

In one embodiment of the present invention, inventive material has an integral peak width in the differential capacity plot (dQ)/(dV) between 4.1 and 4.25 V of at least 25 mV in the second charge cycle by at 0.2 C rate. Such inventive materials are particularly useful because they show a superior cycling stability and reduced resistance growth compared to materials with a more narrow peak width.

The differential capacity plot is typically calculated by differentiating the capacity Q vs. voltage V according to Eq. 1:

$$(dQ)/(dV)=(Q_t-Q_{t-1})/(V_t-V_{t-1}) \quad \text{(Eq. 1)}$$

where $V_t$, $Q_t$, are voltage V and capacity Q measured at the time t, and $V_{t-1}$ and $Q_{t-1}$ are the corresponding voltage and capacity measured at the previous time t−1. At standard C rates of 0.1-1 C, data points are typically measured every 30 s-60 s, or after predefined voltage changes, for instance 5 mV. Data points can be additionally interpolated and smoothened by an appropriate software to improve the quality of the (dQ)/(dV) plot.

The integral peak width in the differential capacity (dQ)/(dV) of the second charge at 0.2 C-rate between 4.1 V and 4.25 V is defined by the integral I of the corresponding (dQ)/(dV) plot in the second charge between 4.1 V and 4.25 V divided by the maximum m of the corresponding (dQ)/(dV) plot in the second charge between 4.1 V and 4.25 V as illustrated in FIG. 1 and defined in Eq. 2.

$$^{2nd\ charge}IPW_{4.1\ V\text{-}4.25\ V}=I/m \quad \text{(Eq. 2)}$$

Inventive materials are particularly suitable as cathode active materials for lithium ion batteries. They combine good cycling stability with a high energy density.

In one embodiment of the present invention inventive cathode active material contains in the range of from 0.001 to 1% by weight $Li_2CO_3$, determined by titration as $Li_2CO_3$ and referring to said inventive material.

Another aspect of the present invention relates to a process for making inventive materials, hereinafter also referred to as inventive process or process according to the (present) invention. The inventive process comprises several steps, hereinafter also referred to as step (a), step (b) etc.

Steps (a) to (e) are characterized as follows:

(a) providing a particulate lithium nickel oxide, (b) mixing said lithium nickel oxide with one or two solutions of compounds of $M^1$ or with particulate oxides or hydroxides of $M^1$, (c) optionally, removing the solvent from step (b), (d) thermally treating the solid obtained from step (b) or (c), respectively.

Steps (a) to (c) are described in more detail below.

In step (a), a particulate lithium nickel oxide, hereinafter altogether also referred to as $LiNiO_2$. In the context of the present invention, the term lithium nickel oxide is not limited to stoichiometric $LiNiO_2$ but to compounds with slightly deviating stoichiometry, for example an undercut of lithium of up to 5 mole-% or an excess of lithium of up to 7 mol-%, each with respect to nickel.

The $LiNiO_2$ provided in step (a) has an average particle diameter (D50) in the range of from 2 to 20 μm, preferably from 4 to 16 μm. The average particle diameter can be determined, e. g., by light scattering or LASER diffraction or electroacoustic spectroscopy. The particles may be composed of agglomerates from primary particles, and the above particle diameter refers to the secondary particle diameter.

$LiNiO_2$ may be synthesized by precipitating a nickel hydroxide, adding a source of lithium such as $Li_2O$, LiOH, or $Li_2CO_3$, and calcining at 600 to 800° C. in the presence of oxygen, preferably in pure oxygen.

In step (b), said nickel oxide/hydroxide is mixed with one or two solutions of compounds of $M^1$ or with particulate oxides or hydroxides of $M^1$. Suitable solvents depend on the kind of compound of $M^1$.

Alkanolates of $M^1$ are well soluble in the corresponding alcohols. Examples of water-soluble compounds of $M^1$ are for instance but not limited to ammonium metatungstate (hydrate), ammonium orthomolybdate, ammonium heptamolybdate, ammonium dimolybdate, ammonium niobate oxalate, ammonium zirconium (IV) carbonate, either as such or as hydrates.

Examples of suitable compounds of Fe are $Fe(NO_3)_3$ and the acetonyl acetonate of Fe. Examples of suitable compounds of Ce and of Y are $Ce(NO_3)_3$, $Ce(OH)_3$, $Ce_2O_3$, $Y(NO_3)_3$, $Y(OH)_3$ and $Y_2O_3$.

Examples of suitable compounds of $M^1$ are $Al_2(SO_4)_3$, $KAl(SO_4)_2$, and $Al(NO_3)_3$, alkanolates of Al such as, but not limited to $Al(C_2H_5O)_3$, Al-tris-isopropoxide, $Mg(NO_3)_2$, $Mg(SO_4)_2$, $MgC_2O_4$, alkanolates of Mg such as, but not limited to $Mg(C_2H_5O)_2$, $NaBO_2$, $H_3BO_3$, $B_2O_3$, alkanolates of B such as, but not limited to B-tris-isopropoxide, $Ga(NO_3)_3$, $Ga_2(SO_4)_3$, alkanolates of Ga such as, but not limited to $Ga(CH_3O)_3$, Ga-tris-isopropoxide or mixed salts of at least 2 cations such as aluminum magnesium isopropoxide. A suitable solvent for $Al_2(SO_4)_3$, $KAl(SO_4)_2$, $Al(NO_3)_3$, $Mg(NO_3)_2$, $Mg(SO_4)_2$, $MgC_2O_4$, $NaBO_2$, $H_3BO_3$, $B_2O_3$, $Ga(NO_3)_3$, and $Ga_2(SO_4)_3$ is water. Alkanolates of $M^1$ are well soluble in the corresponding alcohols.

In one embodiment of the present invention, the counterions of all $M^1$ are the same or similar, e.g., two different alkanolate ions. In such embodiments, said nickel oxide/hydroxide may be treated with one solution that contains compounds of all $M^1$.

In another embodiment of the present invention, the counterions of various $M^1$ are different, for example Al nitrate and alkoxides of all $M^1$ but Al. In such embodiments, said nickel oxide/hydroxide is treated subsequently with a solution that contains Al and a solution that contains all $M^1$ other than Al.

In one embodiment of step (b), the solution(s) used in step (b) contains 0.001 to 60% by weight of compounds of $M^1$. In another embodiment of step (b), the solution used in step (b) contains in total 0.002 to 70% by weight of compounds of $M^1$.

In one embodiment of the present invention, the solution or at least one solution containing compounds of $M^1$ additionally contains a compound of Ni, for example nickel nitrate or an alkanolate of nickel.

In an alternative embodiment of the present invention, lithium nickel oxide is mixed with particulate oxides or hydroxides of $M^1$, preferably with nanoparticulate oxides or hydroxides of $M^1$. The term "hydroxide" in this context is not restricted to stoichiometric hydroxides but includes partially dehydrated hydroxides that may by termed oxyhydroxides.

Examples of oxides or hydroxides of $M^1$ are FeO, FeOOH, $Fe(OH)_3$, $Fe_2O_3$, $Ta_2O_5$, $Y_2O_3$, CoO, $Co_2O_3$, $Co_3O_4$, MnO, $MnO_2$, $Mn_2O_3$, $Al_2O_3$, AlOOH, $Al(OH)_3$, ZnO, $Zn(OH)_2$, SnO, $SnO_2$, CuO, $ZrO(OH)_2$, $Zr(OH)_4$, $ZrO_2$, $ZrO_2\cdot aq$, all as such and with crystal water.

The average diameter (D50) of oxides or hydroxides of $M^1$ is preferably in the range of from 10 nm to 100 μm, preferably 20 nm to 20 μm. Preferred are so-called nanoparticulate oxides or hydroxides of $M^1$, for example with an average diameter (D50) from 100 nm to 2 μm, measured by LASER diffraction or dynamic light scattering ("DLS").

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with lithium nickel oxide from step (c) followed by introduction of solution(s) of compounds of $M^1$. In another embodiment, such vessel is charged with a solution of compounds of $M^1$ followed by introduction of lithium nickel oxide. In another embodiment, lithium nickel oxide and solution of compounds of $M^1$ are introduced simultaneously.

In one embodiment of the present invention, the volume ratio of lithium nickel oxide and of solution(s) of compounds of $M^1$ in step (b) is in the range of from 10:1 to 1:5, preferably from 10:1 to 1:1, even more preferably from 10:1 to 5:1.

Treatment of the $LiNiO_2$ with the solution(s) of $M^1$ may take place over a period of from 1 minute to 3 hours, preferably from 5 minutes to 1 hour, even more preferably from 5 to 30 minutes.

Treatment of the lithium nickel oxide with oxides or hydroxides of $M^1$ may be performed in a ball mill, in absence or presence of water, or by spray-drying of a slurry.

Step (b) may be supported by mixing operations, for example shaking or in particular by stirring or shearing, see below.

In one embodiment of the present invention, steps (b) and (c) are combined: In one embodiment of the present invention, step (b) is performed by slurrying said $LiNiO_2$ from step (a) in a solution containing some $M^1$ followed by removal of the solvent by a solid-liquid separation method or by evaporation, step (c-1), and then re-slurrying the residue in a solution containing the other $M^1$, removing the respective solvent by a solid-liquid separation method or by evaporation, step (c-2), and drying at a maximum temperature in the range of from 50 to 450° C.

In the optional step (c), solvent(s) is/are removed. Suitable embodiments of removal of solvents are solid-liquid separation methods, for example decanting and filtration, for example on a band filter or in a filter press. Further examples are evaporation of the solvent(s).

In one embodiment of step (c), the slurry obtained in step (b) is discharged directly into a centrifuge, for example a decanter centrifuge or a filter centrifuge, or on a filter device, for example a suction filter or in a belt filter that is located preferably directly below the vessel in which step (b) is performed. Then, filtration is commenced.

In a particularly preferred embodiment of the present invention, steps (b) and (c) are performed in a filter device with stirrer, for example a pressure filter with stirrer or a suction filter with stirrer. At most 3 minutes after—or even immediately after—having combined starting material and solution(s) of $M^1$ in accordance with step (b), removal of solvent is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake. By commencement of the filtration, for example pressure filtration or suction filtration, after a maximum time of 3 minutes after commencement of step (b), step (c) is started.

In one embodiment of the present invention, the solvent removal in accordance to step (c) has a duration in the range of from 1 minute to 1 hour.

In one embodiment of the present invention, stirring in step (b)—and (c), if applicable—is performed with a rate in the range of from 1 to 50 rounds per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ and/or moisture content, e.g., a carbon dioxide and/or moisture content in the range of from 0.01 to 500 ppm by weight, preferred are 0.1 to 50 ppm by weight. The $CO_2$ and/or moisture content may be determined by, e.g., optical methods using infrared light. It is even more preferred to perform steps (b) and (c) under an atmosphere with a carbon dioxide and/or moisture content below detection limit for example with infrared-light based optical methods.

In one embodiment of the present invention, step (c) is performed by evaporating the solvents, preferably under reduced pressure. Such embodiments are preferred when the solvent(s) are organic solvents, e.g., ethanol or isopropanol.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

In one embodiment of the present invention, step (c) is performed by evaporating the solvents, preferably under reduced pressure, or by spray-drying. Such embodiments are preferred when the solvent(s) are organic solvents, e.g., methanol or ethanol or isopropanol. Suitable temperatures for evaporation are 80 to 150° C.

A powdery residue is obtained from step (c) in embodiments wherein step (b) is performed in the presence of a solvent.

Step (d) includes thermally treating the solid obtained from step (b) or (c), respectively. If no step (c) is performed, step (d) starts from the solid resulting from step (b).

Examples of step (e) are heat treatments at a temperature in the range of from 600 to 800° C., preferably 650 to 750° C. The terms "treating thermally" and "heat treatment" and "thermal treatment" are used interchangeably in the context of the present invention.

In one embodiment of the present invention, the mixture obtained from step (d) is heated to 600 to 800° C. with a heating rate of 0.1 to 10° C./min.

In one embodiment of the present invention, the temperature is ramped up before reaching the desired temperature of from 600 to 800° C., preferably 650 to 750° C. For example, first the mixture obtained from step (d) is heated to a temperature to 350 to 550° C. and then held constant for a time of 10 min to 4 hours, and then it is raised to 650° C. up to 800° C. and then held at 650 to 800 for 10 minutes to 10 hours.

In one embodiment of the present invention, step (d) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (d) is performed in an oxygen-containing atmosphere, for example in a nitrogen-air mixture, in a rare gas-oxygen mixture, in air, in oxygen or in oxygen-enriched air. In a preferred embodiment, the atmosphere in step (d) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (d) is performed under a stream of gas, for example air, oxygen and oxygen-enriched air. Such stream of gas may be termed a forced gas flow. Such stream of gas may have a specific flow rate in the range of from 0.5 to 15 $m^3/h\cdot kg$ material according to general formula $Li_{1+x}TM_{1-x}O_2$. The volume is determined under normal conditions: 298 Kelvin and 1 atmosphere. Said stream of gas is useful for removal of gaseous cleavage products such as water and carbon dioxide.

The inventive process may include further steps such as, but not limited, additional calcination steps at a temperature in the range of from 650 to 800° C. subsequently to step (d).

In one embodiment of the present invention, step (d) has a duration in the range of from one hour to 30 hours. Preferred are 10 to 24 hours. The time at a temperature above 600° C. is counted, heating and holding but the cooling time is neglected in this context.

A material is obtained that is excellently suitable as cathode active material for lithium ion batteries.

In one embodiment of the present invention, it is possible to treat inventive material with water and subsequently drying it. In another embodiment, it is possible to at least partially coat particles of inventive material, for example by mixing it with an oxide or hydroxide, for example with aluminum hydroxide or alumina or with boric acid, followed by thermal treatment at 150 to 400° C. In another embodiment of the present invention, it is possible to at least partially coat particles of inventive material by way of atomic layer deposition methods, for example by alternating treatment(s) with trimethylaluminum and moisture.

A further aspect of the present invention are electrodes comprising at least one inventive material. They are also referred to as cathodes, and they are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain (A) at least one inventive material, as described above, (B) carbon in an electrically conductive state, and (C) a binder, (D) a current collector.

In a preferred embodiment of the present invention, inventive cathodes contain (A) 80 to 98% by weight inventive material, (B) 1 to 17% by weight of carbon, (C) 1 to 10% by weight of binder material, percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and a-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylenetetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 3 to 10% by weight of binder(s) (d), referring to the sum of component (a), component (b) and carbon (c).

A further aspect of the present invention is a battery, containing (A) at least one cathode comprising inventive cathode active material (A), carbon (B), and binder (C),
(B) at least one anode, and
(C) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Nonaqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

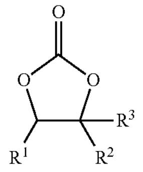
(II)

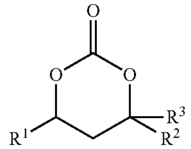
(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

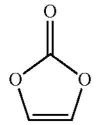
(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

Preferably, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, Preferably, electrolyte (3) comprises at least one flame retardant selected from trimethyl phosphate, $CH_3$—P(O)$(OCH_3)_2$, triphenylphosphate, and tris-(2,2,2-trifluoroethyl) phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 45%. Suitable pore diameters are, for example, in the range from 30 to 500 nm.

Separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

Average particle diameters (D50) were determined by dynamic light scattering ("DLS"). Percentages are % by weight unless specifically noted otherwise.

I. Manufacture of a Base Cathode Active Material, $LiNiO_2$

I.1 Manufacture of a Precursor

Step (a.1): A spherical $Ni(OH)_2$ precursor was obtained by combining aqueous nickel sulfate solution (1.65 mol/kg solution) with an aqueous 25 wt. % NaOH solution and using ammonia as complexation agent. The pH value was set at 12.6. The freshly precipitated $Ni(OH)_2$ was washed with water, sieved and dried at 120° C. for 12 hours. Subsequently, the freshly precipitated $Ni(OH)_2$ was poured into an alumina crucible and dried in a furnace under oxygen atmosphere (10 exchanges/h) at 500° C. for 3 hours using a heating rate of 3° C./min and a cooling rate of 10° C./min to obtain the precursor p-CAM.1. The resultant p-CAM.1 was NiO with a D50 of 6 μm.

I.2 Manufacture of a $LiNiO_2$ as Base Cathode Active Material

The dehydrated precursor p-CAM.1 was mixed with $LiOH \cdot H_2O$ in a molar ratio of Li:Ni of 1.01:1, poured into a alumina crucible and heated at 350° C. for 4 hours and 700° C. for 6 hours under oxygen atmosphere (10 exchanges/h) using a heating rate of 3° C./min. The resultant material was cooled to ambient temperature at a cooling rate of 10° C./min and subsequently sieved using a mesh size of 30 μm to obtain $LiNiO_2$ with a D50 of 6 μm as a base cathode active material, hereinafter also referred to as B-CAM.1.

II. Manufacture of Inventive Cathode Active Materials

II.1 Manufacture of CAM.1

Step (b.1): 10 mmol of each of $Co(NO_3)_2$, $Mn(NO_3)_2$, $Ni(NO_3)_2$, $Mg(NO_3)_2$, $Fe(NO_3)_3$, $Ga(NO_3)_3$, $Al(NO_3)_3$, $Ce(NO_3)_3$, and $Y(NO_3)_3$, were mixed in a beaker. Water was added until a transparent solution had formed. An amount of solution that corresponded to 2 mol-% of $M^1$ in total, referring to Ni in B-CAM.1, was added dropwise to 20 g of B-CAM.1 over a period of 5 minutes at ambient temperature. Additional water was added to ensure that B-CAM.1 was completely impregnated with solution containing the above $M^1$.

Step (c.1): Then, the water was evaporated over one hour at 120° C. at normal pressure.

Step (d.1): The powdery solid obtained from step (c.1) was then poured into an alumina crucible and heated at 500° C. for one hour under oxygen atmosphere (10 exchanges/h) with heating rate of 3° C./min and a subsequent cooling rate of 10° C./min. The material so obtained was subsequently sieved using a mesh size of 32 μm to obtain inventive cathode active material CAM.1. It could be demonstrated by SEM-EDX that the metals $M^1$ were enriched at the outer surface of the secondary particles of CAM.1.

II.2 Manufacture of CAM.2

The protocol of II.1 was followed but step (d.2) was performed at 700° C. instead of 500° C. CAM.2 was obtained. It could be demonstrated by SEM-EDX that the metals $M^1$ were enriched at the outer surface of the secondary particles of CAM.2.

II.3 Manufacture of CAM.3

Step (b.1): 10 mmol of each of $Co(NO_3)_2$, $Mn(NO_3)_2$, $Ni(NO_3)_2$, $Mg(NO_3)_2$, $Fe(NO_3)_3$, $Ga(NO_3)_3$, $Al(NO_3)_3$, $Ce(NO_3)_3$, and $Y(NO_3)_3$, were mixed in a beaker. Methanol was added until a transparent solution had formed. An amount of solution that corresponded to 2 mol-% of $M^1$ in total, referring to Ni in B-CAM.1, was added dropwise to a 20 g of B-CAM.1 over a period of 5 minutes at ambient temperature. Additional methanol was added to ensure that B-CAM.1 was completely impregnated with solution containing the above $M^1$.

Step (c.3): Then, the methanol was evaporated over one hour at 120° C. at normal pressure.

Step (d.3): The powdery solid obtained from step (c.1) was then poured into an alumina crucible and heated at 500° C. for one hour under oxygen atmosphere (10 exchanges/h) with heating rate of 3° C./in and a subsequent cooling rate of 10° C./min. The material so obtained was subsequently sieved using a mesh size of 30 μm to obtain inventive cathode active material CAM.3. It could be demonstrated by SEM-EDX that the metals $M^1$ were enriched at the outer surface of the secondary particles of CAM.3.

II.4 Manufacture of CAM.4

The protocol of II.3 was followed but step (d.4) was performed at 700° C. instead of 500° C. CAM.4 was obtained. It could be demonstrated by SEM-EDX that the metals $M^1$ were enriched at the outer surface of the secondary particles of CAM.4.

II.5 Manufacture of CAM.5

Step (b.5)

Equimolar amounts of the following nanoparticulate oxides were mixed in a planetary mixer: $Co_3O_4$, $Mn_3O_4$, $Y_2O_3$, $Al_2O_3$, $Ta_2O_5$, ZnO, $SnO_2$, CuO, $Fe_2O_3$, and $Zr(OH)_4$.

The duration of mixing was 5 minutes at 1000 revolution per minutes ("rpm"). Then, 5 gram of the above mixture were added to 95 g of B-CAM.1 and mixed in a planetary mixer for 2 minutes at 1000 rpm.

No step (c) was performed.

Step (d.5): The powdery solid obtained from step (b.5) was then poured into an alumina crucible and heated at 500° C. for one hour under oxygen atmosphere (10 exchanges/h) with heating rate of 3° C./in and a subsequent cooling rate of 10° C./min. The material so obtained was subsequently sieved using a mesh size of 30 μm to obtain inventive cathode active material CAM.5. It could be demonstrated by SEM-EDX that the metals $M^1$ were enriched at the outer surface of the secondary particles of CAM.5.

II. 6 Manufacture of CAM.6

The protocol of II.5 was followed but step (d.6) was performed at 700° C. instead of 500° C. CAM.6 was obtained. It could be demonstrated by SEM-EDX that the metals $M^1$ were enriched at the outer surface of the secondary particles of CAM.6.

III. Electrochemical Testing

III.1 Cathode Manufacture, General Protocol

Electrode manufacture: Electrodes contained 94% of the respective CAM or B-CAM.1, 3% carbon black (Super C65) and 3% binder (polyvinylidene fluoride, Solef 5130). Slurries with a total solids content of 61% were mixed in N-methyl-2-pyrrolidone (planetary mixer, 24 minutes, 2,000 rpm) and cast onto aluminum foil tape by a box-type coater. After drying of the electrode tapes for 16 h at 120° C. in vacuo and calendaring, circular electrodes with a diameter of 14 mm were punched, weighed and dried at 120° C. under vacuum for 12 hours before entering in an Ar filled glove box. Average loading: 8 mg/cm$^2$, electrode density: 3 g/cm$^3$.

III.2 Coin Cell Manufacture

Coin-type electrochemical cells were assembled in an argon-filled glovebox. Anode: 0.58 mm thick Li foil, separated from the cathode by a glass fiber separator (Whatman GF/D). An amount of 95 μl of 1 M $LiPF_6$ in ethylene carbonate (EC): ethylmethyl carbonate (EMC), 3:7 by weight, was used as the electrolyte. After assembly, the cells were crimped closed in an automated crimper. The cells were then transferred to a climate chamber and connected to a battery cycler (Series4000, MACCOR).

III.3 Coin Cell Testing

All tests were performed at 25° C. Cells were galvanostatically cycled at a Maccor 4000 battery cycler between 3.1 and 4.3 V at room temperature by applying the following C-rates until 70% of the initial discharge capacity is reached at a certain discharge step:

The test protocol consisted of an initial formation & rate test part, starting with two cycles at C/10. For all cycles, the voltage window was set to 3.0-4.3 V. As an initial 1 C rate, 200 mA $g^{-1}$ were assumed. For all subsequent cycles, the charge was set to CCCV at C/2 and 4.3 V for 30 min or until the current drops below C/100. The cells were discharged at C/5 for five cycles before stepwise increasing the discharge rate (C/10, C/5, C/2, 1 C, 2 C, 3 C). The 1 C rate was then adapted to the capacity of the 1 C discharge. Following the rate test, the state of charge dependent cell resistance was determined by the DCIR method. After a short potential relaxation, a current pulse of 400 mA $g^{-1}$ is applied for 10 s. Following each current pulse, the cell is discharged at C/5 for 30 min before repeat until the cell voltage drops below 3 V. After this initial period, the cells were alternatively cycled for two cycles at C/10 discharge and 50 cycles at 1C discharge. In each second C/10 cycle, the cell potential was relaxed for 5 min at 100, 50 and 25% SOC before applying a 30 s current pulse at 100 mA $g^{-1}$ to calculate the cell resistance by the DCIR method, 2.5C rate discharge pulse for 30 minutes.

TABLE 1

DCIR measurements at 25% and 50% SOC (state-of-charge)

| | Cycle | B-CAM.1 DCIR/Ω | CAM.4 DCIR/Ω | CAM.5 DCIR/Ω | CAM.6 DCIR/Ω |
|---|---|---|---|---|---|
| 50% SOC | 16 | 39.9 | 24.9 | 32.9 | 21.8 |
| | 68 | 66.0 | 43.9 | 66.8 | 25.7 |
| | 120 | 115.3 | 69.7 | 98.5 | 34.2 |
| 25% SOC | 16 | 42.8 | 30.3 | 28.3 | 21.9 |
| | 68 | 89.9 | 81.2 | 45.8 | 27.7 |
| | 120 | 150.3 | 130.6 | 73.8 | 40.7 |

The invention claimed is:

1. A particulate material of a composition $Li_{1+x}TM_{1-x}O_2$, wherein x ranges from −0.02 to +0.05, TM comprises at least 94 mol-% nickel and >0 mol-% up to 6 mol-% of at least three metals $M^1$ selected from Co, Mn, Cu, Mg, Fe, Ga, B, Al, Ce, Sn, Zr, Zn, Nb, Ta, Y, Mo and W, and the particulate material composed of secondary particles that are agglomerates from primary particles, wherein the metals $M^1$ are present in a higher mol-% at the outer surface of the secondary particles than in the core of the particulate material, and wherein the particulate material has an average particle diameter (D50) ranging from 2 μm to 20 μm.

2. The particulate material according to claim 1, wherein TM is a combination of metals according to general formula (I)

$$(Ni_aM^1_{1-a}) \quad (I)$$

with $M^1$ being a combination of at least four of Co, Mn, Mg, Fe, Ga, Al, Ce, Zr, Ta, Zn, Sn, Cu, and Y, and a ranging from 0.97 to 0.995.

3. The particulate material according to claim 1, wherein $M^1$ comprises a combination of Co, Mn, Fe, Al, and Y.

4. The particulate material according to claim 1, wherein the material has an integral peak width $^{2nd\ charge}IPW_{4.1\text{-}4.25\ V}$ in the differential capacity plot (dQ)/(dV) of at least 25 mV between 4.1 and 4.25 V in the second charge cycle at 0.2 C-rate.

5. The particulate material according to claim 1, wherein the molar amount of the most abundant metal $M^1$ differs from the molar amount of the rarest metal $M^1$ by a maximum of 25 mol-%.

6. A process for manufacturing a particulate material according to claim 1, wherein the process comprises the following steps:

(a) providing a particulate lithium nickel oxide, (b) mixing the lithium nickel oxide with one or two solutions of compounds of $M^1$ or with particulate oxides or hydroxides of $M^1$ to generate a solid, (c) removing solvent from step (b), if applicable, and (d) thermally treating the solid obtained from step (b) or (c), respectively.

7. The process according to claim 6, wherein step (d) is performed at a maximum temperature ranging from 500° C. to 750° C.

8. The process according to claim 6, wherein step (c) comprises removing solvent by a solid-liquid separation method.

9. The process according to any of claim 6, wherein at least one solution in step (b) additionally contains a compound of Ni.

10. The process according to claim 6, wherein the lithium nickel oxide is mixed with nanoparticulate oxides or hydroxides of $M^1$.

11. The process according to claim 6, wherein in step (b), a nickel oxide or hydroxide is added as a nanoparticulate.

12. A cathode comprising:

(A) at least one cathode active material according to claim 1, (B) carbon in an electrically conductive form, and (C) at least one binder.

13. An electrochemical cell comprising a cathode according to claim 12.

14. A battery comprising:

(A) at least one cathode according to claim 12, (B) at least one anode, and (C) at least one electrolyte.

* * * * *